United States Patent
Akiyama et al.

(10) Patent No.: US 8,824,096 B1
(45) Date of Patent: Sep. 2, 2014

(54) MOTOR INCLUDING ROTOR HUB WITH RECESSED PORTION AND DISK DRIVE APPARATUS INCLUDING THE SAME

(71) Applicant: Nidec Corporation, Kyoto (JP)

(72) Inventors: Toshihiro Akiyama, Kyoto (JP); Atsushi Yawata, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/173,070

(22) Filed: Feb. 5, 2014

Related U.S. Application Data

(60) Provisional application No. 61/806,473, filed on Mar. 29, 2013.

(51) Int. Cl.
*G11B 17/02* (2006.01)
*H02K 7/08* (2006.01)
*G11B 19/20* (2006.01)
*H02K 7/00* (2006.01)

(52) U.S. Cl.
CPC ............ *G11B 19/2009* (2013.01); *H02K 7/003* (2013.01)
USPC .......................................... 360/99.08; 310/90

(58) Field of Classification Search
None
See application file for complete search history.

(56) References Cited

U.S. PATENT DOCUMENTS

| | | | |
|---|---|---|---|
| 5,504,637 A * | 4/1996 | Asada et al. ................ | 360/98.07 |
| 5,528,092 A * | 6/1996 | Ohta ............................ | 310/67 R |
| 5,587,617 A * | 12/1996 | Dunfield et al. ............. | 310/90.5 |
| 5,596,235 A * | 1/1997 | Yazaki et al. ................ | 310/67 R |
| 5,744,882 A | 4/1998 | Teshima et al. | |
| 5,821,646 A * | 10/1998 | Chuta et al. .................. | 310/67 R |
| 6,700,256 B2 | 3/2004 | Fukutani et al. | |
| 7,675,210 B2 | 3/2010 | Maekawa et al. | |
| 7,913,269 B2 * | 3/2011 | Takaki et al. ................. | 720/707 |
| 8,038,350 B2 | 10/2011 | Hayakawa et al. | |
| 8,711,514 B2 * | 4/2014 | Iwasaki et al. ............. | 360/99.08 |
| 8,711,516 B2 * | 4/2014 | Kodama et al. ............ | 360/99.08 |
| 2007/0210654 A1 * | 9/2007 | Ueda et al. ...................... | 310/51 |
| 2009/0276996 A1 | 11/2009 | Maekawa et al. | |
| 2011/0299193 A1 * | 12/2011 | Sekii et al. ................. | 360/99.08 |
| 2013/0241332 A1 * | 9/2013 | Kim et al. ....................... | 310/90 |

FOREIGN PATENT DOCUMENTS

| | | |
|---|---|---|
| DE | 10 2011 111 396 A1 | 2/2013 |
| JP | 2006-254625 A | 9/2006 |
| JP | 2007-014047 A | 1/2007 |
| JP | 2008-215545 A | 9/2008 |

* cited by examiner

*Primary Examiner* — Brian Miller
(74) *Attorney, Agent, or Firm* — Keating & Bennett, LLP

(57) ABSTRACT

A rotating portion of a motor includes a hub body portion and a shaft arranged to extend in an axial direction. The hub body portion includes a through hole and a recessed portion. The recessed portion extends radially outward from an outside surface of the shaft, has an annular shape and is recessed axially downward. The recessed portion includes first, second, and third ridge portions. The first ridge portion is an axially upper edge of an inside surface defining the through hole, the second ridge portion is arranged radially outward of the first ridge portion, and the third ridge portion is arranged radially outward of the second ridge portion, and is located axially above both the first ridge portion and the second ridge portion. An adhesive is arranged to cover the outside surface of the shaft and reach a portion of the second ridge portion.

16 Claims, 5 Drawing Sheets

MOTOR INCLUDING ROTOR HUB WITH RECESSED PORTION AND DISK DRIVE APPARATUS INCLUDING THE SAME

BACKGROUND OF THE INVENTION

1. Field of the Invention

The present invention relates to a motor and a disk drive apparatus.

2. Description of the Related Art

A disk drive apparatus, such as a hard disk drive, typically has a spindle motor arranged to rotate a disk installed therein. The disk drive apparatus includes the disk, a housing, a stator, an FPC (Flexible Printed Circuit), and so on. The housing includes a cover member, a base portion, and so on.

In recent years, additional reductions in thickness and size have been demanded of disk drive apparatuses. In particular, in order to achieve an additional reduction in thickness of a small-sized disk drive apparatus, a housing or a motor arranged inside the housing itself needs to be made thinner. A common motor includes a rotor hub, a shaft, a stator, a base portion, a bearing, and so on. When the motor is assembled, these members are arranged such that they overlap with one another in an axial direction. In order to achieve a reduction in the thickness of the motor itself, each of these members needs to be made thinner.

Here, in the case of a motor in which a shaft is fixed to a rotor hub, a reduction in thickness of the rotor hub results in shortening of a portion of the rotor hub to which the shaft is fixed. This may result in insufficient fixture of the shaft to the rotor hub. Accordingly, an adhesive in a liquid state is applied to an area where the rotor hub and the shaft are fixed to each other.

The bearing is arranged on a lower side of a lower surface of the rotor hub. In the case where a fluid dynamic bearing is used as the bearing, an external shock or the like may cause lubricating oil to leak out to a space above an upper surface of the rotor hub through the area where the rotor hub and the shaft are fixed to each other. Accordingly, a structure arranged to seal the area where the rotor hub and the shaft are fixed to each other is made necessary to prevent leakage of the lubricating oil.

SUMMARY OF THE INVENTION

A motor according to a preferred embodiment of the present invention includes a stationary portion and a rotating portion. The rotating portion is arranged to be capable of rotating about a central axis relative to the stationary portion. The rotating portion includes a disk-shaped or substantially disk-shaped hub body portion and a shaft arranged to extend in an axial direction. The hub body portion includes a hub through hole and a hub recessed portion. The hub through hole is arranged to pass through the hub body portion, and is arranged to have the shaft fixed therein. The hub recessed portion is arranged to extend radially outward from an outside surface of the shaft to assume an annular shape. The hub recessed portion is arranged to be recessed axially downward. The hub recessed portion includes a first ridge portion, a second ridge portion, and a third ridge portion. The first ridge portion is an axially upper edge of an inside surface defining the hub through hole. The second ridge portion is annular or substantially annular, and is arranged radially outward of the first ridge portion. The third ridge portion is annular or substantially annular. The third ridge portion is arranged radially outward of the second ridge portion, and is located axially above both the first ridge portion and the second ridge portion.

An adhesive is arranged to cover a boundary between the first ridge portion and the outside surface of the shaft throughout an entire circumferential extent thereof. The adhesive is arranged to cover the outside surface of the shaft and reach at least a portion of the second ridge portion.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
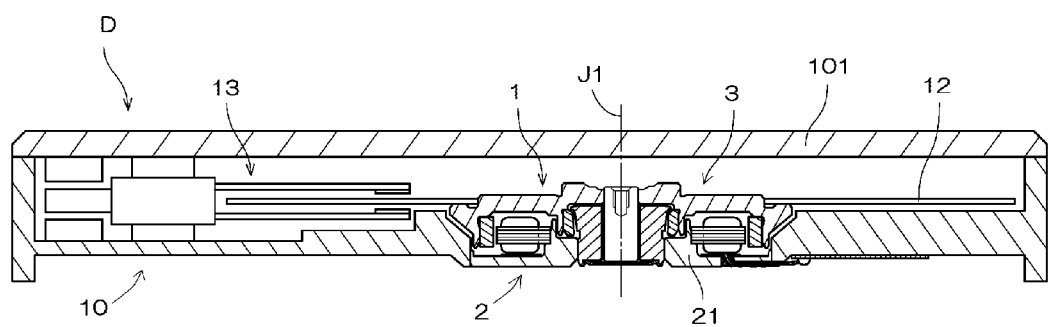
FIG. 1 is a cross-sectional view of a disk drive apparatus according to a preferred embodiment of the present invention.

It is assumed herein that a vertical direction is defined as a direction in which a central axis of a motor extends, and that an upper side and a lower side along the central axis of the motor in FIG. 1 are referred to simply as an upper side and a lower side, respectively. It should be noted, however, that the above definitions of the vertical direction and the upper and lower sides are not meant to indicate relative positions or directions of different members or portions when they are actually installed in a device. Also note that directions parallel to or substantially parallel to the central axis are referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Figure 2:
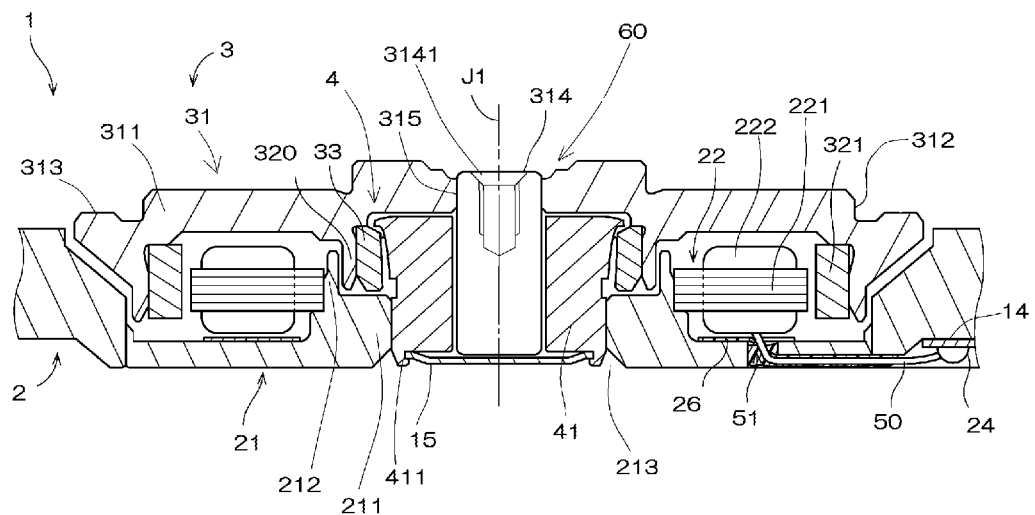
FIG. 2 is a cross-sectional view of a motor according to a preferred embodiment of the present invention.

FIG. 1 is a cross-sectional view of a disk drive apparatus D according to a preferred embodiment of the present invention. FIG. 2 is a partial enlarged view illustrating a spindle motor 1 according to a preferred embodiment of the present invention. Hereinafter, the spindle motor 1 will be referred to simply as the motor 1. The disk drive apparatus D is preferably a small-sized hard disk drive.

The disk drive apparatus D preferably includes the motor 1, a housing 10, at least one disk 12, magnetic heads 13, a connector (not shown), and so on. The disk 12 is attached to the motor 1. Each magnetic head 13 is arranged to perform at least one of reading and writing of information from or to the disk 12. Each magnetic head 13 is driven by an actuator (not shown). A base portion 21 is arranged to define a portion of the housing 10 together with a cover member 101. The housing 10 is arranged to contain the motor 1, the disk 12, the magnetic heads 13, and so on.

As illustrated in FIG. 2, the motor 1 is preferably of an outer-rotor type. In the present preferred embodiment, the motor 1 is preferably a three-phase motor having three phases, a U phase, a V phase, and a W phase. The motor 1 includes a stationary portion 2, a rotating portion 3, and a fluid dynamic bearing mechanism (hereinafter referred to as a "bearing mechanism 4"). The rotating portion 3 is supported by the bearing mechanism 4 to be rotatable about a central axis J1 of the motor 1 with respect to the stationary portion 2.

The stationary portion 2 preferably includes the base portion 21, a substantially annular stator 22, and a circuit board 14. The base portion 21 is preferably a plate-shaped or substantially plate-shaped member. The base portion 21 is arranged to define a portion of the housing 10. The base portion preferably includes a bearing holding portion 211 and a stator holding portion 212. The bearing holding portion 211 preferably is tubular or substantially tubular. The bearing holding portion 211 is arranged to extend axially upward from the base portion 21. The stator holding portion 212 is preferably a tubular or substantially tubular member. The stator holding portion 212 is arranged to extend axially upward from an upper end portion of the bearing holding portion 211. A base through hole 213 is preferably arranged in the base portion 21. The base through hole 213 is arranged to pass through the base portion 21 in an axial direction. An inside surface of the bearing holding portion 211 is arranged to define the base through hole 213.

The stator 22 is arranged radially outward of the base through hole 213. The stator holding portion 212 is arranged to hold the stator 22. The stator 22 includes a stator core 221 and coils 222.

The stator core 221 preferably includes a core back (not shown) and a plurality of teeth (not shown). The core back is tubular, extending in the axial direction. The stator holding portion 212 is inserted inside the core back. An outside surface of the stator holding portion 212 is fixed to an inside surface of the core back preferably through, for example, press fitting, crimping, adhesion, or the like. The stator core 221 is thereby fixed to the stator holding portion 212.

The teeth are arranged to extend radially outward from an outside surface of the core back. Each of the teeth includes a winding portion (not shown) and a tip portion (not shown). A conducting wire is wound around the winding portion to define the coil 222. The tip portion is arranged to extend in both directions circumferentially from an outer edge portion of the winding portion.

In the stator 22, a plurality of lead wires 50 are drawn out from the coils 222 of the respective phases (the U phase, the V phase, and the W phase). In this preferred embodiment, the number of lead wires 50 is preferably three. Each lead wire 50 is electrically connected to the circuit board 14. Each lead wire 50 is connected to the circuit board 14 through, for example, soldering. At a lower surface of the base portion 21, a fixing portion 24 is defined at a position where the lead wire 50 is connected to the circuit board 14.

A flexible printed circuit board, a connector, and the like are preferable examples of the circuit board 14. The circuit board 14 is arranged on the lower surface of the base portion 21. An insulation sheet 26 is arranged on an upper surface of the base portion 21. The insulation sheet 26 is annular or substantially annular when viewed in the axial direction. The insulation sheet 26 is axially opposed to the stator 22. At least one outlet 51 is arranged in the base portion 21. Each lead wire 50 is arranged to pass through the outlet 51 to be led to a space below the base portion 21. The outlet 51 is preferably sealed with, for example, a resin member or the like, for example. Dust and the like are thereby prevented from entering into the motor 1 from an outside. Note that a portion of the circuit board 14 may not be in contact with the lower surface of the base portion 21.

As illustrated in FIG. 2, the rotating portion 3 preferably includes a rotor hub 31 and a rotor magnet 321. The rotor hub 31 preferably includes a hub body portion 311, a first hub cylindrical portion 312, an annular disk mount portion 313, a shaft 314, a second hub cylindrical portion 320, and a stopper 33.

The hub body portion 311 is preferably disk-shaped or substantially disk-shaped. The hub body portion 311 preferably includes a hub through hole 315. The hub through hole 315 is arranged to pass through the hub body portion 311 in the axial direction. The first hub cylindrical portion 312 is arranged to extend downward from an outer edge portion of the hub body portion 311. The disk mount portion 313 is arranged to extend radially outward from an outside surface of the first hub cylindrical portion 312. The at least one disk 12 is preferably mounted on the disk mount portion 313 (see FIG. 1).

The second hub cylindrical portion 320 is arranged between the hub through hole 315 and the first hub cylindrical portion 312. The second hub cylindrical portion 320 is arranged to extend axially downward from the hub body portion 311. An outside surface of the second hub cylindrical portion 320 is preferably arranged radially opposite the stator holding portion 212.

The stopper 33 is preferably a tubular or substantially tubular member. The stopper 33 is preferably fixed to an inside surface of the second hub cylindrical portion 320 through, for example, press fitting, adhesion, or the like.

The rotor magnet 321 is annular or substantially annular and centered on the central axis J1. The rotor magnet 321 is preferably arranged inside the first hub cylindrical portion 312. The disk mount portion 313 is located radially outside an upper portion of the rotor magnet 321. The rotor magnet 321 is arranged radially outside the stator 22. Once the motor 1 is driven, a torque is produced between the rotor magnet 321 and the stator 22.

The shaft 314 is preferably a cylindrical or substantially cylindrical member. An upper end portion of the shaft 314 is inserted in the hub through hole 315. The upper end portion of the shaft 314 is preferably fixed in the hub through hole 315 through, for example, press fitting, adhesion, etc. When the rotating portion 3 rotates, the shaft 314 also rotates about the central axis J1.

A screw hole 3141 is preferably arranged in an upper portion of the shaft 314. An inside surface defining the screw hole 3141 is arranged to extend in the axial direction. The screw hole 3141 is preferably not arranged to pass through the shaft 314 in the axial direction. The inside diameter of the screw hole 3141 is arranged to gradually increase with increasing height at a top portion of the screw hole 3141. When the disk drive apparatus D is assembled, a screw (not shown) is inserted into the screw hole 3141. The screw fixes a clamper (not shown) arranged to fix the disk 12 to the hub body portion 311.

As illustrated in FIG. 2, the bearing mechanism 4 is preferably a fluid dynamic bearing. The bearing mechanism 4 includes a lubricating oil (not shown) and a bearing 41. In this preferred embodiment, the bearing 41 is preferably a sleeve (hereinafter described as the sleeve 41). The sleeve 41 is a cylindrical or substantially cylindrical member. The shaft 314 is inserted in the sleeve 41. The sleeve 41 preferably includes a communicating hole (not shown) arranged to pass through the sleeve 41 in a vertical direction.

At least a portion of the sleeve 41 is held inside the bearing holding portion 211. The inside surface of the bearing holding portion 211 is arranged opposite to an outside surface of the sleeve 41. The inside surface of the bearing holding portion 211 is preferably fixed to the outside surface of the sleeve 41 through, for example, adhesion or the like. The sleeve is arranged to rotatably support the shaft 314 through the lubricating oil when the rotating portion 3 rotates with respect to the stationary portion 2. The lubricating oil is arranged between the shaft 314 and the sleeve 41.

An upper end portion of the sleeve 41 is arranged axially opposite a lower surface of the hub body portion 311. The outside surface of the sleeve 41 is arranged radially opposite the stopper 33. A radially outer end portion of a top portion of the sleeve 41 is arranged axially opposite the stopper 33. Therefore, if an external shock or the like causes the rotating portion 3 to move in the axial direction, the sleeve 41 makes contact with the stopper 33. As a result, the rotating portion 3 is prevented from becoming disengaged from the stationary portion 2.

A cap member 15 is preferably arranged axially below the sleeve 41. The cap member 15 is preferably disk-shaped or substantially disk-shaped. The cap member 15 is arranged axially opposite both a lower end portion of the shaft 314 and a lower end portion of the sleeve 41.

At least one projecting portion 411 arranged to project axially is arranged at an outer circumferential edge of the lower end portion of the sleeve 41. The cap member 15 is fixed by radially inward bending of the projecting portion(s) 411. In other words, the cap member 15 is crimped by the projecting portion(s) 411. As a result, the lower end portion of the sleeve 41 is sealed by the cap member 15. Note that a plurality of projecting portions 411 may be provided, or alternatively, a projecting portion 411 extending over the entire outer circumferential edge of the lower end portion of the sleeve 41 may be provided.

Note that the cap member 15 may be fixed to the sleeve 41 through, for example, press fitting, adhesion, or the like, instead of the crimping. The cap member 15 may be fixed to the base portion 21.

Figure 3:
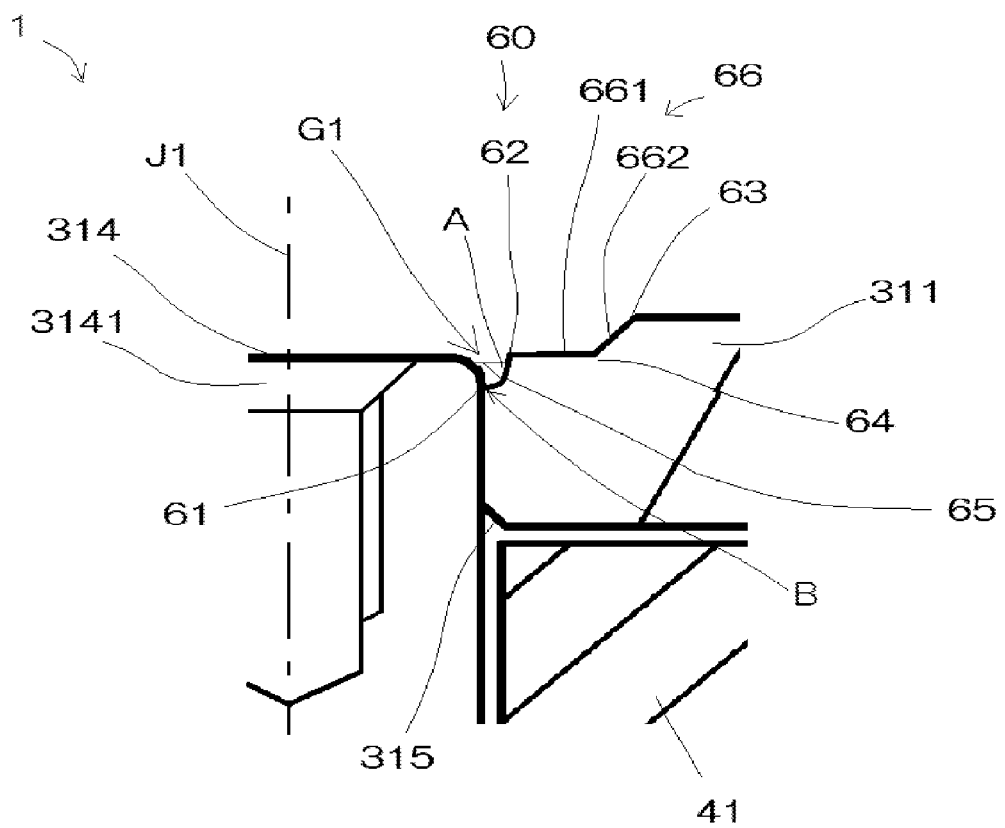
FIG. 3 is a partial enlarged view of the motor according to a preferred embodiment of the present invention.

FIG. 3 is a diagram illustrating a portion of the motor 1 according to a preferred embodiment of the present invention in an enlarged form. As illustrated in FIG. 3, the hub body portion 311 preferably includes a hub recessed portion 60. The hub recessed portion 60 is arranged to extend radially outward from an outside surface of the shaft 314 to assume an annular shape. More specifically, the hub recessed portion 60 is arranged to extend radially outward from an outer circumferential edge of the upper end portion of the shaft 314 to assume an annular or substantially annular shape. The hub recessed portion 60 is arranged to be recessed axially downward in an upper surface of the hub body portion 311.

The hub recessed portion 60 preferably includes a first ridge portion 61, a second ridge portion 62, and a third ridge portion 63. The first ridge portion 61 is an axially upper edge of an inside surface defining the hub through hole 315. The first ridge portion 61 is annular or substantially annular. The first ridge portion 61 is opposed to the outside surface of the shaft 314. The first ridge portion 61 is arranged to surround the outside surface of the shaft 314.

A first joint surface 65 is preferably arranged to extend radially outward from the first ridge portion 61. The first joint surface 65 is arranged to extend in a circumferential direction to surround the first ridge portion 61. In this preferred embodiment, the first joint surface 65 is a curved surface. The radial distance between the central axis J1 and the first joint surface 65 is arranged to gradually increase with increasing height.

The second ridge portion 62 is arranged radially outward of the first ridge portion 61. The second ridge portion 62 is arranged at a radially outer end portion of the first joint surface 65. The second ridge portion 62 is annular or substantially annular. The axial level of the second ridge portion 62 is preferably arranged to be the same as that of an upper end of the shaft 314 or higher than that of the upper end of the shaft 314. The position of the second ridge portion 62 is arranged axially above that of the first ridge portion 61. That is, the outside surface of the shaft 314, the first ridge portion 61, the first joint surface 65, and the second ridge portion 62 are preferably arranged to together define a gap G1 which is recessed axially downward. A bottom portion of the gap G1 is located axially below the upper end of the shaft 314.

The third ridge portion 63 is arranged radially outward of the second ridge portion 62. The third ridge portion 63 is annular or substantially annular. The third ridge portion 63 is arranged to surround the second ridge portion 62. The position of the third ridge portion 63 is arranged axially above that of each of the first ridge portion 61 and the second ridge portion 62.

A second joint surface 66 is preferably arranged between the second ridge portion 62 and the third ridge portion 63. The second joint surface 66 is arranged to extend radially outward from the second ridge portion 62. The second joint surface 66 is preferably annular or substantially annular, and is arranged to surround the second ridge portion 62. The second ridge portion 62 is arranged at a radially inner end portion of the second joint surface 66. The third ridge portion 63 is arranged at a radially outer end portion of the second joint surface 66.

The second joint surface 66 preferably includes a fourth ridge portion 64, a second flat portion 661, and a second inclined portion 662. The fourth ridge portion 64 is arranged in the second joint surface 66. The fourth ridge portion 64 is annular or substantially annular. The fourth ridge portion 64 is arranged to extend in the circumferential direction to surround the second ridge portion 62. The axial position of the fourth ridge portion 64 is preferably arranged to be the same or substantially the same as that of the second ridge portion 62. That is, the position of the fourth ridge portion 64 is arranged axially above that of the first ridge portion 61. The axial level of the fourth ridge portion 64 is arranged to be the same or substantially the same as that of the upper end of the shaft 314 or higher than that of the upper end of the shaft 314.

The second flat portion 661 is arranged between the second ridge portion 62 and the fourth ridge portion 64. The second flat portion 661 is annular or substantially annular when viewed in the axial direction. The second ridge portion 62 is arranged at a radially inner end portion of the second flat portion 661. The fourth ridge portion 64 is arranged at a radially outer end portion of the second flat portion 661. The second flat portion 661 is preferably arranged to be parallel or substantially parallel to the upper surface of the hub body portion 311. The radial width of the second flat portion 661 is arranged to be greater than the radial width of the first joint surface 65. The second flat portion 661 is located axially above the first joint surface 65.

The second inclined portion 662 is arranged between the third ridge portion 63 and the fourth ridge portion 64. The second inclined portion 662 is annular or substantially annular when viewed in the axial direction. The second inclined portion 662 is preferably inclined with respect to the central axis J1. The radial distance between the central axis J1 and the second inclined portion 662 is arranged to gradually increase with increasing height. The third ridge portion 63 is arranged at a radially outer end portion of the second inclined portion 662.

The axial position of the second inclined portion 662 is arranged to be the same or substantially the same as or higher than that of the gap G1.

Note that the second flat portion 661 may not necessarily be parallel or substantially parallel to the upper surface of the hub body portion 311. The second flat portion 661 may be a curved surface or an inclined surface which is inclined with respect to the central axis J1. The second inclined portion 662 may not necessarily be an inclined surface. The second inclined portion 662 may be a curved surface.

After the motor 1 is assembled, an adhesive A in a cured state is preferably arranged in the gap G1. The adhesive A is arranged to cover a boundary B between the first ridge portion 61 and the outside surface of the shaft 314 throughout an entire circumferential extent thereof. The adhesive A is arranged to cover at least a portion of the outside surface of the shaft 314. In more detail, the adhesive A is arranged to cover the outer circumferential edge of the upper end portion of the shaft 314. The adhesive A is arranged axially below the upper end of the shaft 314.

This prevents the lubricating oil from leaking above the upper surface of the hub body portion 311 through the boundary B.

The adhesive A is arranged to reach at least a portion of the second ridge portion 62. Preferably, the adhesive A is not arranged to reach either of the second flat portion 661 or the second inclined portion 662. More preferably, the adhesive A is arranged to reach the entire second ridge portion. Still more preferably, the adhesive A is arranged to reach the entire second ridge portion, and reach the second ridge portion throughout an entire circumferential extent thereof. The adhesive A is thus prevented from making contact with the screw when the screw has been inserted into the screw hole 3141.

Once the adhesive A, which is applied to the gap G1 in a liquid state, reaches at least a portion of the second ridge portion, action of surface tension of the adhesive A at the second ridge portion makes it less likely for the adhesive in the liquid state to flow radially outward beyond the second ridge portion. Accordingly, a reduction in the likelihood that the adhesive A in the liquid state will flow radially outward beyond the second ridge portion is achieved.

In addition, once the adhesive A in the liquid state is applied to a region (corresponding to the gap G1) radially inward of the second ridge portion, the adhesive A stays in this region. Therefore, the adhesive A in the liquid state is cured in the gap G1. The cured adhesive A covers the boundary B between the outside surface of the shaft 314 and the first ridge portion 61 throughout the entire circumferential extent thereof. Accordingly, the lubricating oil is prevented from leaking above the upper surface of the hub body portion 311 through the boundary B.

The adhesive A in the gap G1 is preferably arranged to have a radial width smaller than the axial thickness thereof. Accordingly, an area over which the adhesive A is in contact with the outside surface of the shaft 314 is large. This enables the adhesive A to firmly fix the shaft 314 and the hub body portion 311 to each other.

The radial width of the adhesive A in the gap G1 is preferably arranged to be smaller than the width of the second flat portion 661. Accordingly, even in the case where a portion of the adhesive A is arranged on the second flat portion 661, the volume of the adhesive A in the gap G1 is larger than the volume of the portion of the adhesive A arranged on the second flat portion 661. That is, more of the adhesive A is prone to stay in the gap G1 than on the second flat portion 661. As a result, an area over which the adhesive A is in contact with the outside surface of the shaft 314 and the hub body portion 311 is increased. This enables the adhesive A to firmly fix the shaft 314 and the hub body portion 311 to each other.

When the cured adhesive A is formed, the upper end portion of the shaft 314 is preferably first inserted in the hub through hole 315. As described above, the upper end portion of the shaft 314 is fixed to the inside surface of the hub through hole 315 through press fit or the like. The adhesive A in the liquid state is thereafter arranged in the hub recessed portion 60. The adhesive A covers the boundary B between the outside surface of the shaft 314 and the first ridge portion 61 throughout the entire circumferential extent thereof. An adhesive which is cured by ultraviolet rays, for example, is preferably used as the adhesive A. After a process of irradiating the adhesive A in the liquid state with ultraviolet rays, a process of heating the adhesive A in the liquid state, and so on are performed, the adhesive A in the liquid state is cured. As a result, the adhesive A is able to firmly fix the shaft 314 and the hub body portion 311 to each other. Note that a thermosetting adhesive, an anaerobic adhesive, or the like may be used as the adhesive A.

While preferred embodiments of the present invention have been described above, a variety of modifications of the above-described preferred embodiments can be made without departing from the spirit and scope of the present invention.

Figure 4:
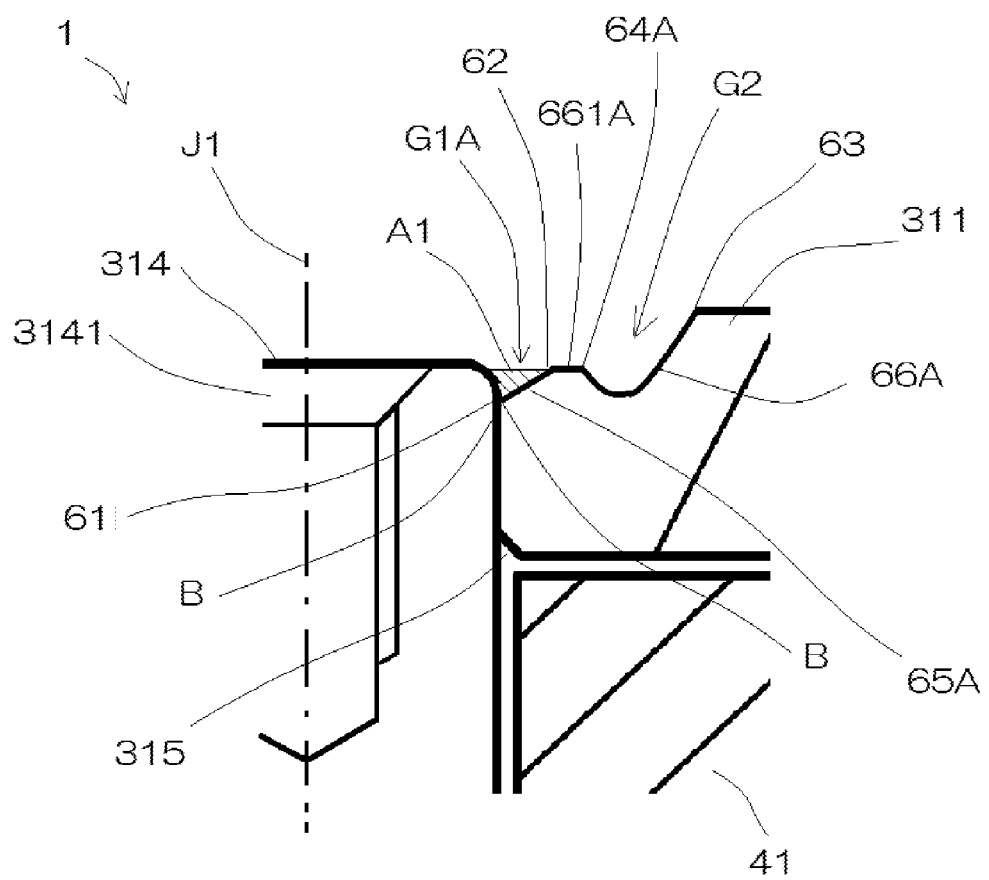
FIG. 4 is a partial enlarged view of a motor according to a preferred modification of a preferred embodiment of the present invention.

FIG. 4 is a partial enlarged view illustrating a preferred modification of an above-described preferred embodiment of the present invention. As illustrated in FIG. 4, a first joint surface 65A is preferably an inclined surface which is inclined with respect to the central axis J1. The radial distance between the central axis J1 and the first joint surface 65A is arranged to gradually increase with increasing height.

A gap G1A is defined by an outside surface of a shaft 314, a first ridge portion 61, a second ridge portion 62, and the first joint surface 65A in a manner similar to that described above. The gap G1A is preferably arranged to have a radial width greater than the width of a second flat portion 661A. An adhesive A1 is arranged in the gap G1A. In a manner similar to that described above, the adhesive A1 is also arranged to cover a boundary B between the first ridge portion 61 and the outside surface of the shaft 314 throughout an entire circumferential extent thereof.

A fourth ridge portion 64A is arranged between the second ridge portion 62 and a third ridge portion 63. The axial position of the fourth ridge portion 64A is arranged to be the same or substantially the same as that of the second ridge portion 62. The second flat portion 661A is preferably arranged between the second ridge portion 62 and the fourth ridge portion 64A. The fourth ridge portion 64A is located at the same or substantially the same axial level as or at an axial level higher than that of an upper end of the shaft 314.

A groove portion G2 is preferably arranged between the third ridge portion 63 and the fourth ridge portion 64A. The groove portion G2 is arranged to be recessed axially downward on a hub body portion 311. A second joint surface 66A is arranged to define an inside surface of the groove portion G2. The groove portion G2 is arranged to extend in the circumferential direction. The groove portion G2 is preferably annular or substantially annular when viewed in the axial direction. The groove portion G2 is arranged to extend in the circumferential direction to surround both the first ridge portion 61 and the second ridge portion 62.

A bottom portion of the groove portion G2 is preferably a curved surface. The axial position of a lowermost end of the bottom portion of the groove portion G2 is arranged to be substantially the same as or higher than that of a bottom portion of the gap G1A. The axial position of the second flat portion 661A is preferably arranged to be the same or substantially the same as that of the upper end of the shaft 314.

The radial distance between the second ridge portion and the fourth ridge portion 64A is arranged to be shorter than the radial distance between the fourth ridge portion 64A and the third ridge portion 63. Accordingly, in the case where the adhesive A1, which is arranged in the gap G1A in a liquid state, travels across the second flat portion 661A, the adhesive A1 tends to easily flow from the second flat portion 661A into the groove portion G2. Moreover, the third ridge portion 63 is arranged axially above both the first ridge portion 61 and the second ridge portion 62. Accordingly, even if the adhesive A1 in the liquid state travels from the gap G1A to the groove portion G2, the adhesive A1 tends to easily stay in the groove portion G2. It is desirable that a surface of the adhesive A1 arranged in the groove portion G2 should be arranged axially below the second ridge portion 62. This contributes to preventing the adhesive A1 in the groove portion G2 from being adhered to a head of the screw or the like when the motor 1 is assembled.

Figure 5:
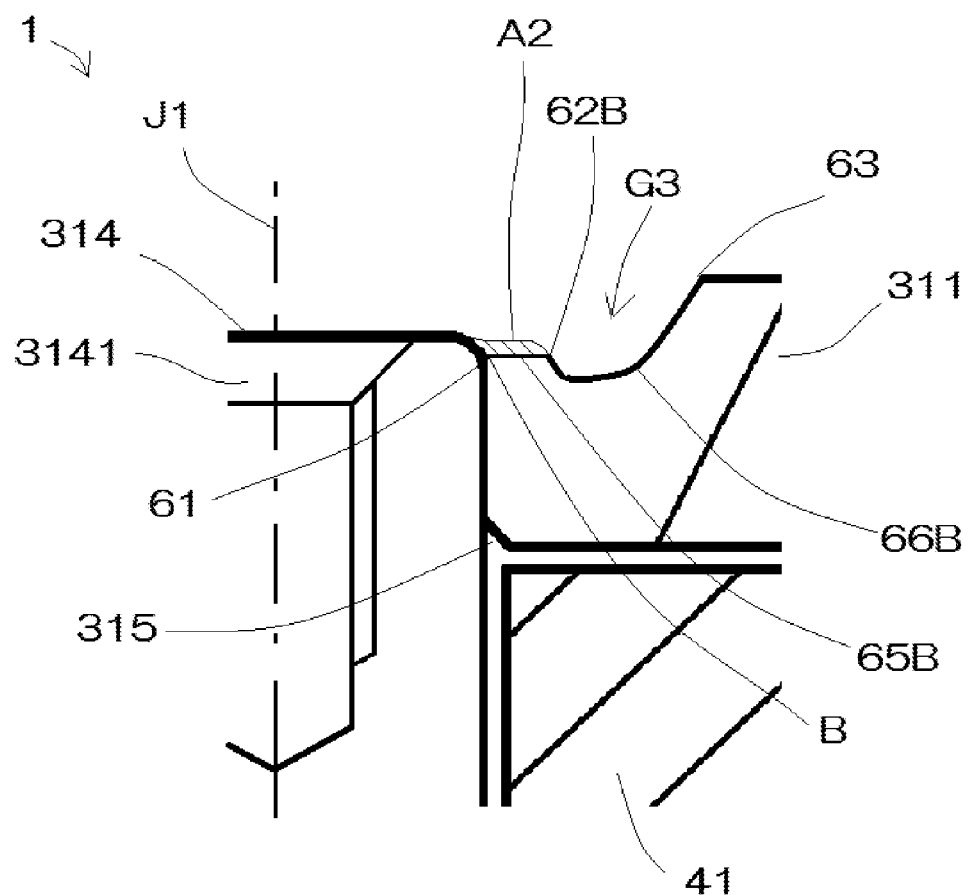
FIG. 5 is a partial enlarged view of a motor according to a preferred modification of a preferred embodiment of the present invention.

FIG. 5 is a partial enlarged view illustrating a preferred modification of an above-described preferred embodiment of the present invention. As illustrated in FIG. 5, the axial position of a second ridge portion 62B is preferably arranged to be the same or substantially the same as that of a first ridge portion 61. In other words, a first joint surface 65B is arranged to extend in directions perpendicular or substantially perpendicular to the central axis J1. The first joint surface 65B is annular or substantially annular when viewed in the axial direction.

A groove portion G3 is preferably arranged between the second ridge portion 62B and a third ridge portion 63. The gap G3 is preferably arranged to extend in the circumferential direction. The gap G3 is annular or substantially annular when viewed in the axial direction. The gap G3 is arranged to be recessed axially downward on the hub body portion 311. A second joint surface 66B is preferably arranged to define an inside surface of the groove portion G3. A radially outer edge of the gap G3 is the third ridge portion 63. A radially inner edge of the gap G3 is the second ridge portion 62B.

The gap G3 is arranged to have a radial width greater than that of the first joint surface 65B. In other words, the radial distance between the second ridge portion 62B and the third ridge portion 63 is arranged to be longer than the radial distance between the first ridge portion 61 and the second ridge portion 62B.

An adhesive A2 is preferably arranged on an outside surface of a shaft 314 and the first joint surface 65B. That is, an adhesive A2 is arranged on the outside surface of the shaft 314, the first joint surface 65B, and a boundary B. At least a portion of the adhesive A2 is arranged on the second ridge portion. In the case where the adhesive A2 in the liquid state travels beyond the second ridge portion 62B, the adhesive A2 stays in the groove portion G3. The axial position of a lowermost end of a bottom portion of the groove portion G3 is arranged to be lower than that of the first joint surface 65B. A surface of the adhesive A2 in the groove portion G3 is arranged axially below the first joint surface 65B. Accordingly, when the motor 1 is assembled, the adhesive A2 in the groove portion G3 is prevented from being adhered to the head of the screw or the like.

Note that a portion of each of the adhesives A, A1, and A2 may alternatively be adhered to an upper end surface of the shaft 314 if so desired. In such a case, it is desirable that no portion of the adhesive A, A1, or A2 should be arranged in the screw hole 3141.

Each of the first joint surfaces 65, 65A, and 65B may be a surface other than the curved surface or the inclined surface. Each of the first joint surfaces 65, 65A, and 65B may include an uneven portion. An area over which the adhesive A, A1, or A2 is in contact with the hub body portion 311 is thus increased. As a result, the shaft 314 is firmly fixed to the hub body portion 311.

At least one additional ridge portion may be arranged between the first ridge portion 61 and the second ridge portion 62 or 62B. Also, a plurality of ridge portions may be arranged between the second ridge portion 62 or 62B and the third ridge portion 63.

As mentioned above, the motor 1 is preferably a three-phase motor. Note, however, that the number of phases of the motor 1 does not particularly need to be limited to three. For example, the motor 1 may be a single-phase motor, a polyphase motor having two, five, or seven phases, or the like.

The base portion 21 may be defined by either a single member or a plurality of members. The base portion 21 may be formed by, for example, a cutting process, press working, or the like.

The preferred embodiments of the present invention and modifications thereof are applicable to, for example, a spindle motor for use in a disk drive apparatus, a motor installed in an electronic device, a fan motor, and so on.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a stationary portion; and
a rotating portion arranged to rotate about a central axis relative to the stationary portion; wherein
the rotating portion includes:
a disk-shaped or substantially disk-shaped hub body portion; and
a shaft arranged to extend in an axial direction;
the hub body portion includes:
a hub through hole arranged to pass through the hub body portion and to have the shaft fixed therein; and
a hub recessed portion arranged to extend radially outward from an outside surface of the shaft to define an annular or substantially annular shape and to be recessed axially downward;
the hub recessed portion includes:
a first ridge portion being an axially upper edge of an inside surface defining the hub through hole;
an annular or substantially annular second ridge portion arranged radially outward of the first ridge portion;
an annular or substantially annular third ridge portion arranged radially outward of the second ridge portion, and located axially above both the first ridge portion and the second ridge portion; and
an adhesive arranged to cover a boundary between the first ridge portion and the outside surface of the shaft throughout an entire circumferential extent thereof; wherein
the adhesive is arranged to cover the outside surface of the shaft and reach at least a portion of the second ridge portion.

2. The motor according to claim 1, wherein the adhesive has a radial width smaller than an axial thickness thereof.

3. The motor according to claim 1, wherein the third ridge portion is arranged axially above the second ridge portion.

4. The motor according to claim 1, wherein the adhesive is arranged to cover an outer circumferential edge of an upper end portion of the shaft.

5. The motor according to claim 1, wherein the second ridge portion is arranged at a same or substantially a same axial level as that of an upper end of the shaft or at an axial level higher than that of the upper end of the shaft.

6. The motor according to claim 1, wherein the hub recessed portion includes a first joint surface arranged to extend radially outward from the first ridge portion and surround the first ridge portion.

7. The motor according to claim 6, wherein an axial position of the first joint surface is substantially the same as, or lower than, that of the second ridge portion.

8. The motor according to claim 1, wherein the hub recessed portion includes an annular groove portion arranged to be recessed axially downward between the second ridge portion and the third ridge portion.

9. The motor according to claim 8, wherein the hub recessed portion includes an annular or substantially annular fourth ridge portion arranged in the annular groove portion.

10. The motor according to claim 9, wherein an axial position of the second ridge portion is arranged to be substantially the same as that of the fourth ridge portion.

11. The motor according to claim 8, wherein a bottom portion of the annular groove portion is located axially below the second ridge portion.

12. The motor according to claim 1, wherein an axial position of the first ridge portion is arranged to be substantially the same as that of the second ridge portion.

13. The motor according to claim 1, wherein an axial position of the first ridge portion is arranged to be lower than that of an upper end of the shaft.

14. The motor according to claim 1, wherein an axial position of the third ridge portion is arranged to be higher than that of an upper end of the shaft.

15. The motor according to claim 1, further comprising an adhesive seal portion defined by:
- an upper end portion of the shaft is inserted into the hub through hole; and
- the adhesive is arranged to cover the boundary between the first ridge portion and the outside surface of the shaft throughout the entire circumferential extent thereof.

16. A disk drive apparatus comprising:
a motor comprising:
- a stationary portion; and
- a rotating portion arranged to rotate about a central axis relative to the stationary portion; wherein
the rotating portion includes:
- a disk-shaped or substantially disk-shaped hub body portion; and
- a shaft arranged to extend in an axial direction;
the hub body portion includes:
- a hub through hole arranged to pass through the hub body portion and to have the shaft fixed therein; and
- a hub recessed portion arranged to extend radially outward from an outside surface of the shaft to define an annular or substantially annular shape and to be recessed axially downward;
the hub recessed portion includes:
- a first ridge portion being an axially upper edge of an inside surface defining the hub through hole;
- an annular or substantially annular second ridge portion arranged radially outward of the first ridge portion;
- an annular or substantially annular third ridge portion arranged radially outward of the second ridge portion, and located axially above both the first ridge portion and the second ridge portion; and
- an adhesive arranged to cover a boundary between the first ridge portion and the outside surface of the shaft throughout an entire circumferential extent thereof;
a disk arranged to be rotated by the motor;
a magnetic head arranged to perform at least one of reading and writing from or to the disk;
an actuator arranged to drive the magnetic head; and
a housing arranged to contain the motor, the disk, the magnetic head, and the actuator; wherein
the adhesive is arranged to cover the outside surface of the shaft and reach at least a portion of the second ridge portion.

* * * * *